United States Patent [19]

Sell

[11] Patent Number: 5,601,116
[45] Date of Patent: Feb. 11, 1997

[54] AIR WINCH CONTROL VALVE

[75] Inventor: Leslie J. Sell, Bothell, Wash.

[73] Assignee: Ingersoll-Rand Company, Woodcliff Lake, N.J.

[21] Appl. No.: 650,496

[22] Filed: May 20, 1996

Related U.S. Application Data

[62] Division of Ser. No. 301,082, Sep. 6, 1994, Pat. No. 5,558,125.

[51] Int. Cl.$^6$ .................................................. F16K 11/16
[52] U.S. Cl. .......................... 137/625.27; 137/627.5; 137/596.18; 251/282
[58] Field of Search .................. 137/625.27, 625.25, 137/625.66, 627.5, 596.18; 251/282

[56] References Cited

U.S. PATENT DOCUMENTS

| | | | |
|---|---|---|---|
| 1,679,614 | 8/1928 | Lichtenberg | 137/625.27 X |
| 2,152,084 | 3/1939 | Paine | 137/625.27 X |
| 3,270,774 | 9/1966 | Stuart | 137/596.18 |
| 3,390,943 | 7/1968 | Myers | 137/596.18 X |
| 3,556,145 | 1/1971 | Sugden | 137/596.15 |
| 3,584,539 | 6/1971 | Sugden | 91/454 |
| 3,596,679 | 8/1971 | Sugden | 137/636 |
| 3,756,280 | 9/1973 | Parquet | 137/625.27 X |
| 3,926,218 | 12/1975 | Weller | 137/625.27 |
| 3,974,861 | 8/1976 | Goto et al. | 137/627.5 |
| 4,027,700 | 6/1977 | Perkins | 137/625.27 X |
| 4,271,868 | 6/1981 | Neff | 137/625.64 |
| 4,353,290 | 10/1982 | Hoffman et al. | 91/461 |
| 4,574,844 | 3/1986 | Neff et al. | 137/625.65 |
| 4,793,380 | 12/1988 | Lhota | 137/627.5 |
| 5,309,936 | 5/1994 | Christensen | 137/106 |

FOREIGN PATENT DOCUMENTS

| | | | |
|---|---|---|---|
| 501018 | 11/1954 | Italy | 137/625.27 |
| 27121 | 4/1911 | United Kingdom | 137/625.27 |

*Primary Examiner*—John Rivell
*Attorney, Agent, or Firm*—Walter C. Vliet

[57] ABSTRACT

A four way control valve of the type used to control air motors or the like utilizing opposed poppet valve in place of spool valves to reduce tolerance requirements and improve function in standard, balanced and pilot operated versions based on one body.

5 Claims, 3 Drawing Sheets

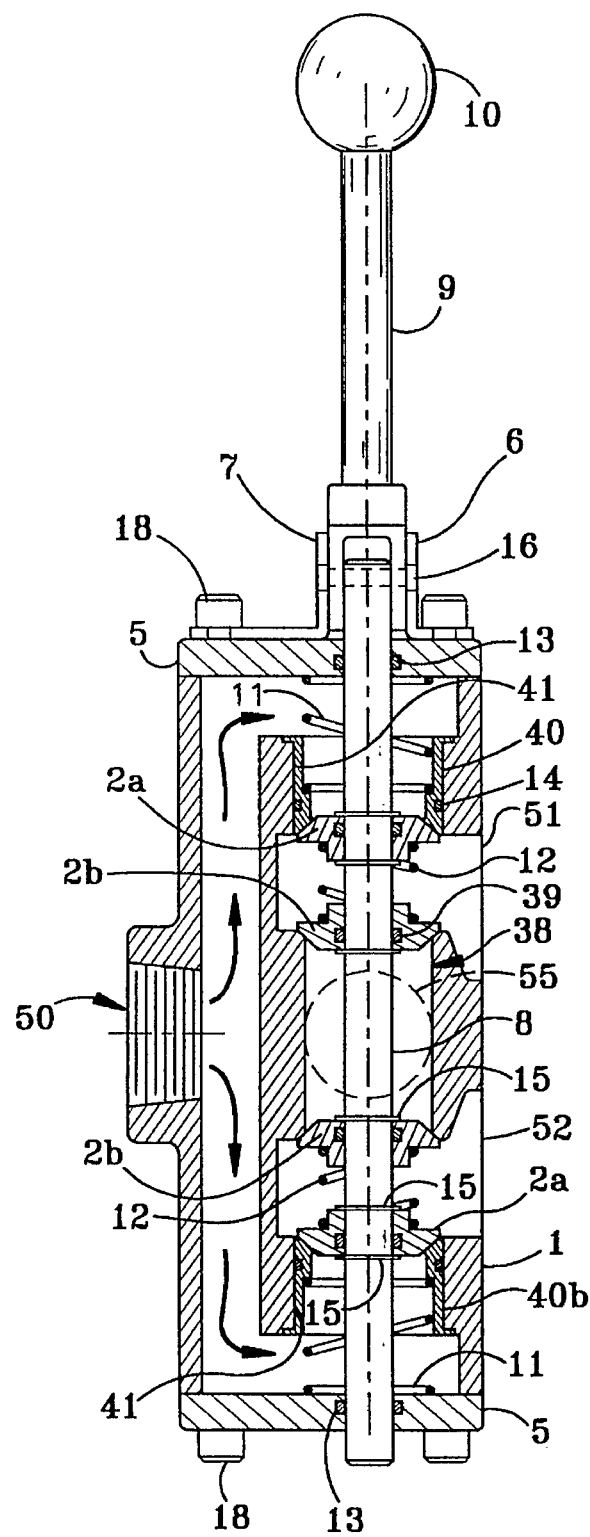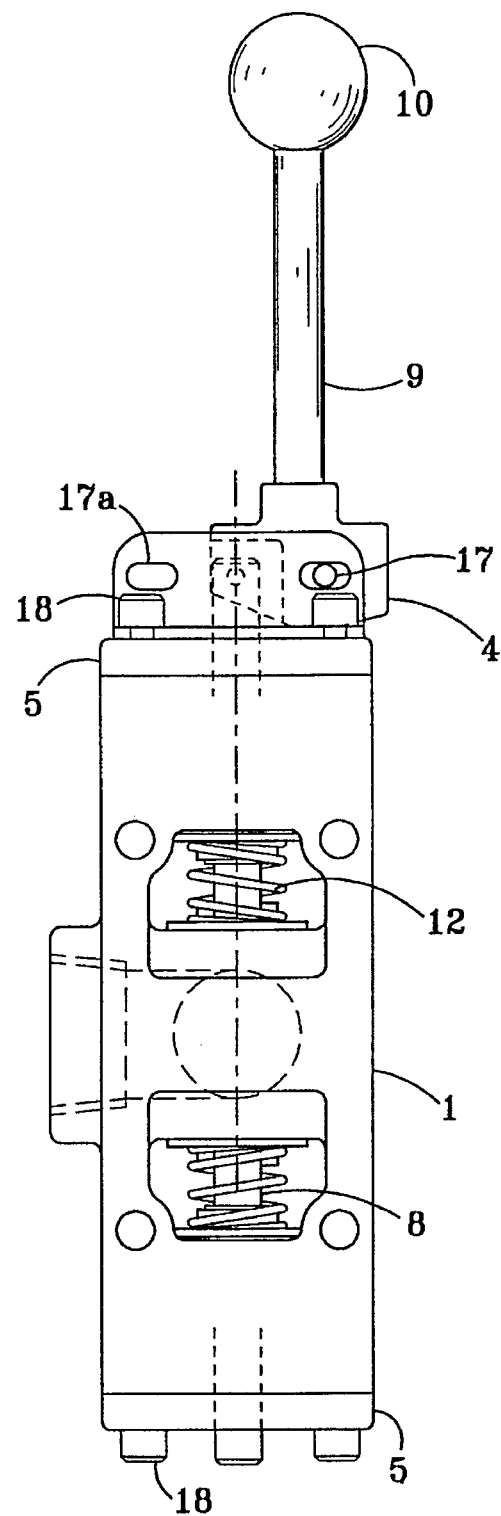
*FIG. 1*   *FIG. 2*

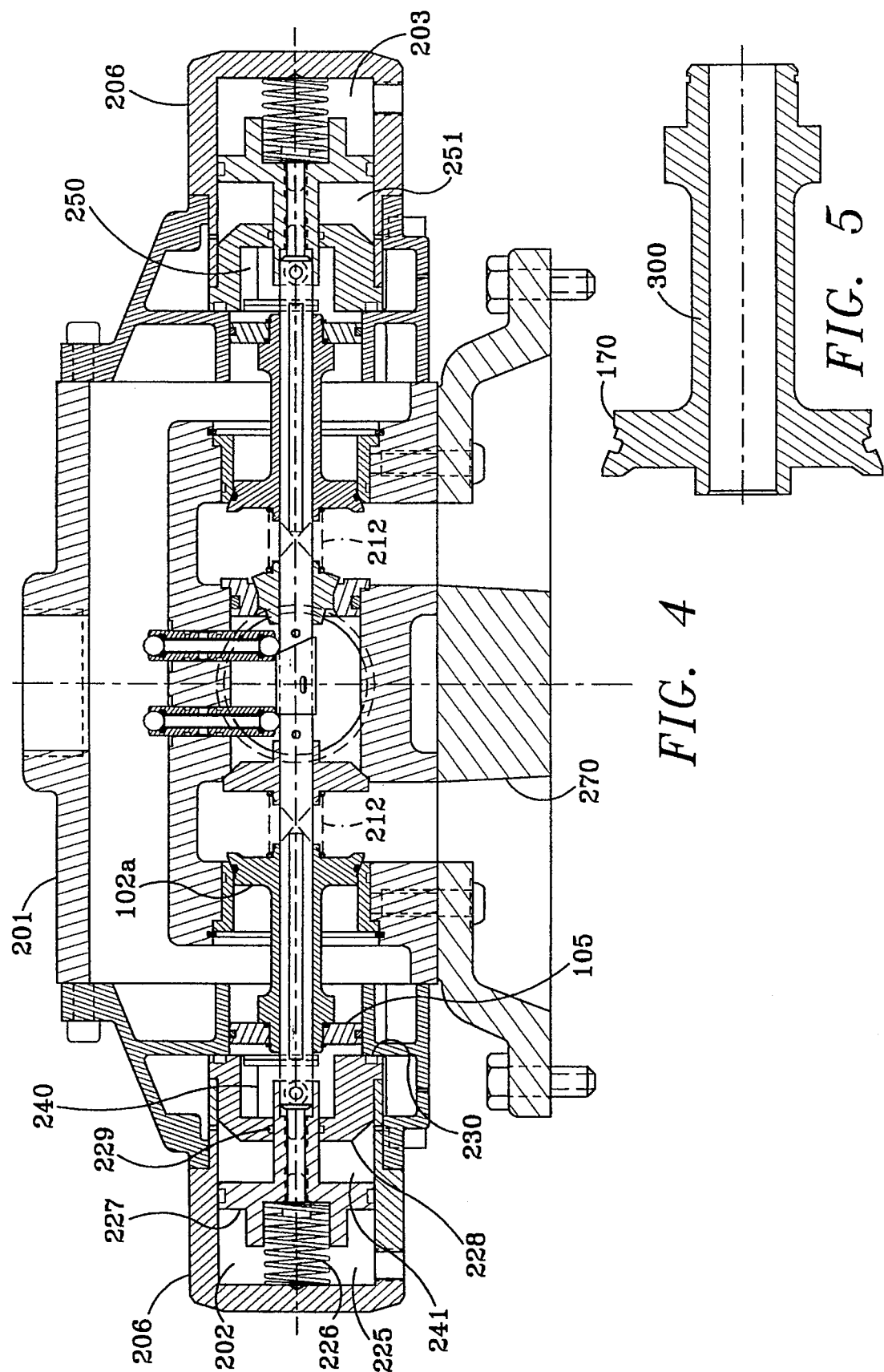

AIR WINCH CONTROL VALVE

This is a division of application Ser. No. 08/301,082 filed Sep. 6, 1994 now U.S. Pat. No. 5,558,125.

BACKGROUND OF THE INVENTION

This invention relates generally to control valves and more particularly to four way directional air valves of the type used to control an air motor that drives a winch or hoist although its use is not limited to these applications.

To operate at maximum efficiency, air motors require a compact four way directional control valve with a large flow capacity designed to mount directly on to the motor. Operation of the valve must be by manual means or by air pilot actuator. The valve when manually operated must be capable of turning a winch motor in either direction when the handle is pulled in the same direction. In applications where the motor causes a load to be raised, a varying amount of restriction at one or other exhaust port on the control valve may be required to slow the downward speed of the load. Because of the special requirements these valves are not available 'off the shelf' so they are custom designed and manufactured in low quantities which makes them many times more costly than a standard high volume valve.

Valves currently being used for these applications fall into three design categories: linear spool, rotary spool and poppet.

Linear or rotary spool type valves are basically simple in that there is only a single machined bore in the valve housing into which a spool sleeve is fitted, the moving or rotating spool being located inside the sleeve. The disadvantages of this type of valve are that they require extremely close fits between the spool and the sleeve to reduce air leakage, making them expensive to machine,. intolerant to dirt and sensitive to distortion which causes the spool to jam when mounting the valve on the motor. Even with close fits, air leakage is still considerable and the spool and sleeve are usually made of heat treated stainless steel to prevent seizing in corrosive environments which adds further to their cost. When exhaust restriction is required on linear or rotary spool valves it is usually accomplished by limiting the spool travel in one direction or by providing a special spool or spool sleeve with a small hole drilled at the appropriate exhaust location. Limiting the spool travel is not usually satisfactory since it causes the air to be restricted into the motor as well as out of it and often the motor will not turn when there is little or no descending load to assist it. Using a special spool sleeve works well except it is not adjustable and a new sleeve is required for each new application. Pilot operation of linear spool valves is generally straightforward but rotary spool valves are not easy to pilot operate since they require a rotary actuator.

Current four way poppet valve designs have two chambers machined into a housing with two poppets seated in each chamber. One poppet in each chamber connects to an air inlet passage whilst the remaining poppet in each chamber connects to an exhaust passage. The poppets which are held against their respective seats by springs are lifted off their seats by a linkage on the valve handle so that to turn the motor in a particular direction, an inlet popper in one chamber is lifted at the same time that an exhaust poppet is lifted in the other chamber, thus allowing air to enter one side of the motor and exhaust out of the other.

Poppet type valves do not require the machined precision of the spool type valves, they are able to operate with little or no air leakage and they tolerate dirt. To hold the poppets against the maximum expected operating pressure however, heavy springs or a balancing piston on the stem of each poppet is required which, in either case, adds to the cost. Because of the double chamber and handle linkage arrangement, the poppet valve is not as adaptable as the linear spool valve when it comes to operating the handle in the same direction for reverse motor operation, also it is more difficult to pilot operate since some type of rotary actuator is required. Because of the need to connect inlet and exhaust passages to two chambers the valve body is relatively complex which further limits its adaptability to different motor requirements.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a directional air valve including: a valve body having a valve bore formed longitudinally therethrough; a pressurized air supply chamber within the valve body and accessing each longitudinal end; an exhaust port accessing the bore intermediate the each longitudinal end; a reciprocating longitudinal shaft disposed within the valve bore having a diameter less than the valve bore; an opposed pair of poppet valve members disposed at each longitudinal end of the valve bore intermediate the pressurized air supply chamber and the exhaust port; a work supply port accessing the valve bore intermediate one of the opposed pair of poppet valve members; a return port accessing the valve bore intermediate a second of the opposed pair of poppet valve members; the poppet valve members being disposed for selective longitudinal reciprocation along the longitudinal shaft; and the poppet valve members being independently displaceable relative to cooperation with the bore and its pair member to effect selective passage of pressurized air received in the pressurized air supply chamber alternatively between the work supply port and the return port and oppositely from one of the supply port or return port to the exhaust port.

The foregoing and other aspects will become apparent from the following detailed description of the invention when considered in conjunction with the accompanying drawing figures.

BRIEF DESCRIPTION OF THE DRAWING FIGURES

FIG. 1 is a sectional view of a four way control valve according to the present invention;

FIG. 2 is a side view of a four way control valve according to the present invention;

FIG. 4 is a sectional view of a third embodiment showing a pilot operated four way control valve according to the present invention; and FIG. 5 is an enlarged sectional view of a valve poppet according to the present invention.

DETAILED DESCRIPTION

Figure 3:
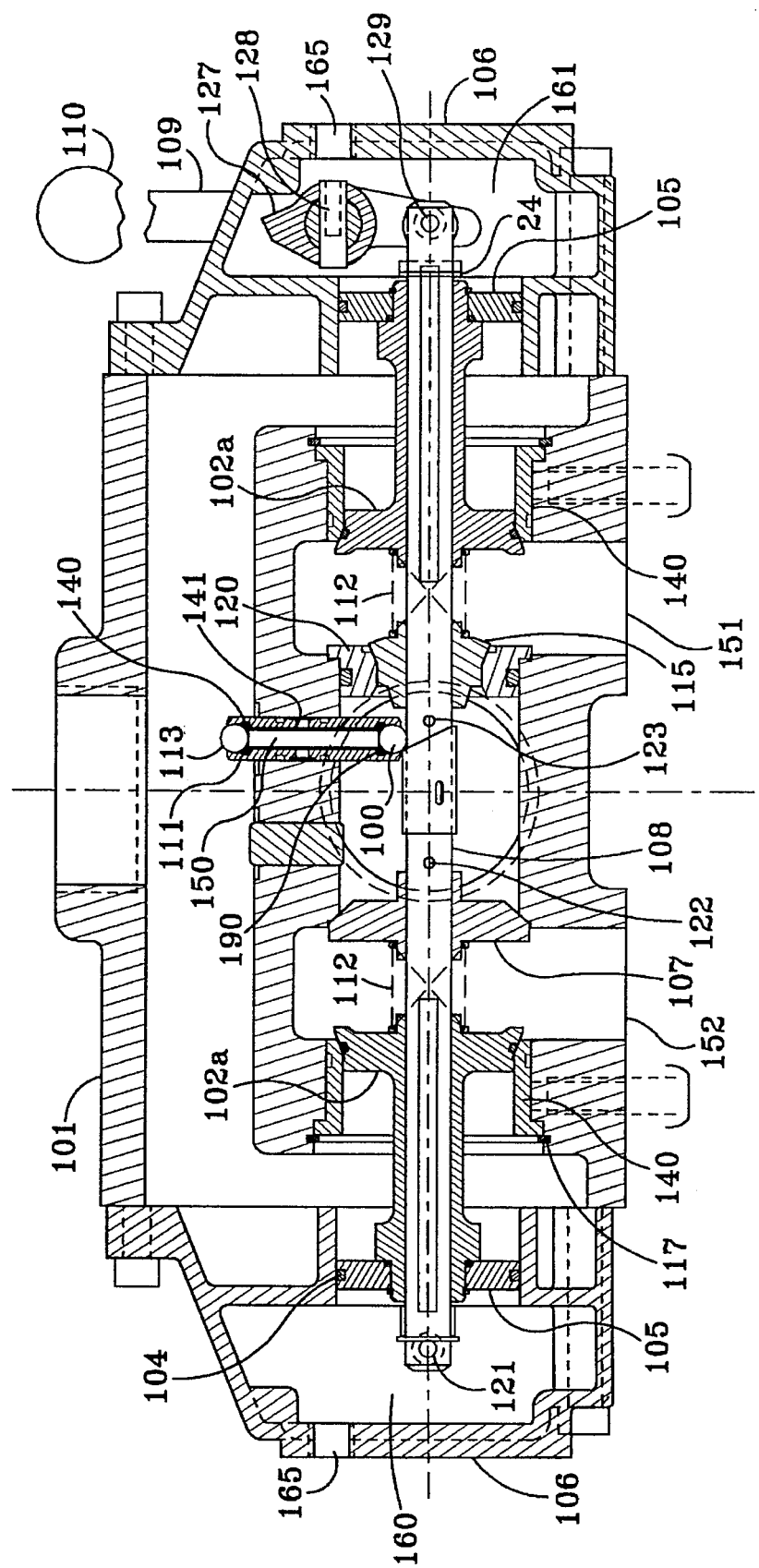
FIG. 3 is a sectional view of a second embodiment showing a balanced four way control valve according to the present invention.

This invention combines the simplicity of the linear type spool valve with the low precision requirement of the poppet type valve in a unique arrangement to create a highly adaptable low cost four way valve the major components of which can be molded or cast complete without secondary machining. The valve is leak proof, easily reversible for reverse motor operation, readily adaptable for manual or pilot operation and simple adjustment of exhaust restriction can be provided for either direction of operation. Materials used in the construction of major components of the valve can be either plastic or nonferrous metal or a combination of both. The valve can be manufactured in various sizes to meet the requirements of different motors.

Referring to FIG. 1 and FIG. 2, these figures show a sectional and side view of a manually operated valve for mounting on to a motor in the vertical position.

Molded or cast valve body 1 has an internal passage that directs inlet air to each end of the valve where it is sealed by identical caps 5 fastened to each end of the valve body by screws 18. Circular shaft 8 passes through the center of a circular cast or molded hole 38 in the valve body and is slidably guided through bearing holes containing O'ring seals 13 in caps 5. Shaft 8 protrudes through caps 5 a sufficient amount to allow attachment of various optional valve operating devices. Shaft 8 carries four identical poppets having O'ring seals 39 located in an internal groove in each poppet. Poppets designated 2a are each fixed in position by shaft 8 by two 'E' type retaining rings 15. Poppets 2b are seated on valve body 1 but are free to slide axially on shaft 8. 'E' type retaining rings 15 positioned on the seat side of each poppet 2b restrict their axial movement in that direction to a minimum amount that allows each poppet 2b to maintain its seat on the valve body at extreme manufacturing tolerances. Coil springs 12 reacting against poppets 2a push poppets 2b lightly against their respective seats. Two identical shouldered bushings 40 having external O'ring seals 14 are slidably located in cast or molded circular holes 41 concentric to hole 38 and are seated against poppets 2a by coil springs 11 reacting against caps 5. A small clearance is maintained between the face of each bushing and its respective counter bored face in the valve body to ensure a positive seat on each poppet 2b. Shaft 8 is pinned by pin 16 to handle fulcrum 4 which in turn pivots on pin 17 located in slotted holes in angle brackets 6 and 7 fastened to one end of the valve by screws 18. Handle 9 and knob 10 are threaded together and this assembly is threaded to fulcrum 4.

With the valve assembled as shown in FIG. 1 and the handle in the neutral position as shown, inlet air pressure entering at port 50 urges bushings 40 to move inward to seat firmly against poppets 2a. Since bushings 40 and poppets 2a are identical, the forces from the bushings acting on the poppets counteract each other through shaft 8 and equilibrium is maintained. When the handle is pulled in the counterclockwise direction as shown in FIG. 2, it rotates about pin 17 causing shaft 8 to move downward. Top poppet 2a which is fixed to shaft 8 moves downward and away from top bushing 40 after the small clearance between the flange on top bushing 40 and the valve body counter bore is taken up. Top poppet 2b remains seated and shaft 8 slides through it. Bottom poppet 2b is pushed downward away from its seat in the valve body by 'E' ring 15 after the small clearance between it and the poppet 2b is taken up. Bottom poppet 2a which is fixed to shaft 8 moves downward pushing bottom bushing 40b downward against the compressible inlet air pressure. Ports 51 and 52 are connected to the motor ports and in the condition just described, inlet air is free to enter port 51 through top bushing 40 and open top poppet 2a and exhaust air from the motor is free to exit via port 52 through open bottom poppet 2b to exhaust hole 55. When the handle is pushed in the clockwise direction, the action is reversed and inlet air is free to enter port 52 through open bottom poppet 2a and exhaust air is free to exit via port 51 through open top poppet 2b to exhaust hole 55. If handle fulcrum 4 is turned 180 degrees about the axis of shaft 8 and pivot pin 17 is placed in slot 17a pulling on the handle will reverse the action of the valve and in this condition port 52 will become the pressure port and port 51 the exhaust port. If the gap between 'E' ring 15 and bottom poppet 2b is increased, bottom poppet 2b will not open as far and therefore exhaust air exiting via port 52 to exhaust hole 55 will be restricted. If the gap is made permanently large to cover the maximum expected requirement, shims can used as needed to increase or decrease the poppet opening and therefore the amount of exhaust restriction. This arrangement can apply to one or both poppets 2b.

Referring again to FIGS. 1 and 2, unlike a spool valve, this valve is unbalanced when moved off center because the required actuating force increases in direct proportion to the work port pressure. Maximum actuating force, reached when the work port and inlet pressures are equal, is the product of the diametral sealing area of shouldered bushings 40 and the inlet pressure. On a manually actuated valve, the increasing force characteristic may be desirable, since it gives feedback to the operator in proportion to the amount of work being done. The varying force would however, cause loss of proportional control on pilot actuated valves, causing the pilot actuator to fully shift the valve at different pilot pressures.

In this (FIG. 1 and FIG. 2) arrangement inlet poppets 2a are constrained to move in each direction with the central actuating shaft 8, which required that shouldered bushings 40 be slidably located in the valve body.

Referring to FIG. 3, a balanced embodiment arrangement is shown, wherein inlet poppet assemblies 102a are constrained to move in only one direction with the central actuating shaft 108, allowing bushings 140 to be secured from sliding in the valve body. In detail, right and left hand inlet poppet assemblies 102a include balancing pistons 105, that are slidably located in right and left hand end caps 106 and are sealed by O'rings 104. Right and left hand poppet seat bushings 140 are secured in the valve body by retaining rings 117. Right and left hand inlet poppet assemblies 102a, exhaust poppet 107 and restrictor poppet 115 are slidably located on central actuator shaft 108. When central actuator shaft 108 is moved to the left, 'E' ring 24 contacts right hand poppet assembly 102a and moves it away from its seat, admitting air into workport 151, whilst pin 122 contacts left hand exhaust poppet 107 and moves it away from its seat allowing exhaust air to escape. When central actuator shaft 108 moves to the right, pins 121, 123 cause their adjacent poppets to move in similar manner.

Right and left hand inlet poppet assemblies 102a are loosely guided on central shaft 108. This provides annular area for pressure communication between work ports 151 and 152 and sealed areas 160 and 161 in end caps 106.

To ensure positive sealing, a small imbalance is induced by making balancing pistons 105 slightly larger in area than the effective sealing area of inlet poppets 102a. When in the closed position, inlet air pressure, acting on the difference in areas, urges the poppets to seal against their respective seats on bushings 140. In normal use, this small imbalance force, augmented by the return springs, is the only force acting and it can be determined from the relationship (I−Y)(B−P)+S is equal to the imbalance force, where:

I=inlet pressure (psi)

Y=work port pressure (psi)

P=effective poppet sealing area (sq. inches)

B=balancing piston area (sq. inches)

S=return spring force (lbs)

This relationship shows that as the workport pressure increases, the imbalance force decreases, and it is 0 when the workport pressure is the same as the inlet pressure. Due to this variation, the imbalance is kept sufficiently small so as to have a negligible effect on the overall operation of the valve. When a valve requires exhaust restriction, there will be an additional variable imbalance force acting, the size of which will depend on the area of the restrictor poppet and the pressure in the return port. To accommodate higher air flows encountered on large valves, exhaust restriction may be in the form of the variable orifice type of restrictor 115, shown on FIGS. 3 and 4. Restrictor poppet 115 provides a variable exhaust orifice that ranges from 0 to maximum at the full open position of the valve. The poppet diameter is kept as small as practical to minimize imbalance forces, and the poppet is tapered to provide the required range of orifice size. Adapter 120 adapts the poppet to the standard valve bore and provides the poppet seat. The adapter also allows the restrictor to be mounted in either port. The restrictor poppet is moved away from its seat by pin 123 when the central actuator shaft moves to the right. As an additional means of adjustment, the pin may be positioned away from the poppet a small amount to create a delay in the poppet opening.

An orifice plug 165 is inserted in each end cap. This bleeds off some of the air in chambers 160 and 161 so that the valve remains partially imbalanced. The size of the orifice may be adjusted to achieve the right "feel" to the handle.

The alternative manual handle arrangement provides an enclosed and sealed method of operating the valve.

Handle 109 is bent to form a horizontal shaft which is pivoted in bearing holes in right hand end cap 106. Clevis 127 is secured to handle 109 by setscrew 128 threaded into handle 109. Setscrew 128 pilots through the left side of clevis 127 and detents on the right hand side of the clevis. Setscrew 128 thus provides a pin that is in double shear plus a frictional clamping force between the handle and the clevis. Pin 129 passes through central actuating shaft 108 and engages slotted holes in clevis 127. With handle 109 mounted above, central actuating shaft 108 moves right when handle 109 pivots counterclockwise to the left. This may be reversed by turning clevis 127 180 degrees and mounting it together with handle 109 below the central actuating shaft.

On winch control valves, it is often desirable to provide a separate on-off air signal to release the winch brake or carry out some other purpose. This air signal is usually required at inlet pressure. A three way valve assembly (consisting of body 111; steel balls 100, 113; O'ring seats 190, 140; and transfer pin 150) is pressed into the main valve body and is positioned such that upper steel ball 113 senses inlet air pressure, whilst the lower steel ball 100 senses a grooved section on central actuator shaft 108, positioned in the exhaust area of the main valve. Steel balls 100, 113 are retained by swaged lips on three way valve body 111 but are free to move away from O'ring seats 190, 140 a small amount. Three way valve body 111 has a cross drilled hole at 141 that communicates through an annular groove with a tapped hole in the main valve body.

When the main valve is in the neutral position, as shown on FIGS. 3 or 4, lower steel ball 100 rests in the groove on actuator shaft 108 away from lower O'ring seat 190. Transfer pin 150 rests on lower steel ball 100 and in this position, it is slightly below upper steel ball 113, which is held close against upper O'ring seat 140 by inlet air pressure. Air from external devices is vented through cross hole at area 141 and through lower O'ring seat 190 into the main valve exhaust area. When central actuator shaft 108 moves to the left, lower ball 100 lifts up out of the groove and seals against lower O'ring seat 190, at the same time, transfer pin 150 lifts upper ball 113 away from upper O'ring seat 140, allowing inlet air pressure to be transmitted via the cross drilled hole in three way valve body 111 to the external device.

Referring to FIG. 4, when pilot operation is required, right and left end caps 206 are modified to incorporate identical pilot actuator assemblies 202 and 203 consisting of cylinder 225, barrier 228, piston 227 and ballast spring 226. O'ring 229 and O'ring 230 on barrier 228 forms sealed area 240 and 250 in front of right hand and left hand actuator assemblies. Piston areas 241 and 251 are vented to atmosphere. The rod area of piston 227 is the same as the difference in area between balancing piston and the effective sealing area of inlet poppet 102a.

Using the symbols of the previous relationship, rod area of piston 227=B−P. The required actuator force is then constant for all work port pressures and is equal to (I−Y)(B−P)+Y(B−P)+S. This does not, however, take into account the unbalanced, variable load caused by exhaust restriction, the effect of which, is felt by the actuator. This load is greatly diminished by maintaining a large difference between the restrictor poppet area and the actuator piston area. Assume that the ratio of the exhaust restrictor area to the actuator piston area is 0.2, then a pressure of 70 lbs. per square inch of exhaust pressure will cause 70 * 0.2=14 lbs. per square inch change in pressure on the actuator, which would be within acceptable limits. Ballast spring 226 is used to establish this ratio and maintain the desired operating pressure range of the actuator.

Each actuator works against the spring in the opposite actuator. The spring load can be determined from the relationship E/R * H−L is equal to he required ballast spring load where:

E=exhaust restrictor area (sq. inches)

R=desired ratio (actuator piston area=E/R)

H=desired maximum actuator pilot pressure (psi)

L=maximum expected load to shift the valve (lbs.)

Both the four way poppet valve of the FIG. 3 and FIG. 4 embodiments may be mounted to any desired bracket or device by means of a mounting bracket 270.

FIG. 5 shows a detail section of a metering poppet 102a of the type suitable for use in the present invention. The poppet 102a includes an extended metering shoulder 170 of nearly constant diameter which fits with close tolerance in the valve bushing to provide a metering effect as opposed to the rapid opening feature of the typical tapered seat of a poppet valve.

What is claimed is:

1. A directional air valve comprising:

a valve body having a valve bore formed longitudinally therethrough;

a pressurized air supply chamber within said valve body and accessing each longitudinal end;

an exhaust port accessing said bore intermediate said each longitudinal end;

a reciprocating longitudinal shaft disposed within said valve bore having a diameter less than said valve bore;

an opposed pair of poppet valve members disposed at each longitudinal end of said valve bore intermediate said pressurized air supply chamber and said exhaust port;

each of said poppet valve members cooperating with a valve seat formed in said bore to effect control of supply of pressurized air and exhaust to and from an air motor;

a means for longitudinally reciprocating said longitudinal shaft;

a work supply port accessing said valve bore intermediate one of said opposed pair of poppet valve members;

a return port accessing said valve bore intermediate a second of said opposed pair of poppet valve members;

the function of said work supply port and said return port being interchangeable;

said poppet valve members being disposed for selective longitudinal reciprocation along said longitudinal shaft; and each pair of poppet valves is provided with a pressure compensating piston external of said pair of poppet valves and said longitudinal bore.

2. A directional air valve according to claim 1, wherein: each pair of poppet valve is provided with a pilot actuator comprising an isolator and a pilot actuating piston within an external end cap.

3. A directional air valve according to claim 1, wherein: a means for sensing the condition of air is provided intermediate between said pressurized air supply chamber and said exhaust port and operable in response to a sensed position of said reciprocating shaft.

4. A directional air valve according to claim 1, wherein: a poppet valve member is provided with an extended constant diameter shoulder for cooperation with said valve bore to effect metering of air flow.

5. A directional air valve according to claim 1, wherein: a poppet valve member is provided with a variable flow restriction in cooperation with a seat provided within said valve bore.

* * * * *